(12) United States Patent
Brandt et al.

(10) Patent No.: US 8,905,191 B2
(45) Date of Patent: Dec. 9, 2014

(54) ASSEMBLY INCLUDING AN AGB AND AN OIL TANK

(75) Inventors: Bernard Brandt, Taverny (FR); Frederic Cotin, Courbevoie (FR); Andre Raymond Christian Deperrois, Paris (FR)

(73) Assignee: Hispano Suiza, Colombes Cedex (FR)

( * ) Notice: Subject to any disclaimer, the term of this patent is extended or adjusted under 35 U.S.C. 154(b) by 212 days.

(21) Appl. No.: 13/146,944

(22) PCT Filed: Jan. 29, 2010

(86) PCT No.: PCT/EP2010/051122
§ 371 (c)(1),
(2), (4) Date: Jul. 29, 2011

(87) PCT Pub. No.: WO2010/086422
PCT Pub. Date: Aug. 5, 2010

(65) Prior Publication Data
US 2011/0284328 A1    Nov. 24, 2011

(30) Foreign Application Priority Data

Jan. 30, 2009   (FR) ..................................... 09 50617

(51) Int. Cl.
*F01D 25/18* (2006.01)
*F02C 6/00* (2006.01)
*F02C 7/32* (2006.01)
*F02C 7/36* (2006.01)

(52) U.S. Cl.
CPC . *F01D 25/18* (2013.01); *F02C 7/32* (2013.01); *F02C 7/36* (2013.01); *F05D 2250/312* (2013.01); *F05D 2260/4031* (2013.01)
USPC .......................................... 184/6.11; 60/802

(58) Field of Classification Search
USPC .......................... 184/6.11, 106; 60/39.08, 802
See application file for complete search history.

(56) References Cited

U.S. PATENT DOCUMENTS

| | | | | |
|---|---|---|---|---|
| 2,432,358 A | * | 12/1947 | Warner | 74/665 GA |
| 2,548,858 A | * | 4/1951 | Benedict | 415/122.1 |
| 2,618,119 A | | 11/1952 | Redding et al. | |
| 2,702,093 A | * | 2/1955 | Sherrill | 184/6.26 |
| 2,803,943 A | * | 8/1957 | Rainbow | 60/262 |

(Continued)

FOREIGN PATENT DOCUMENTS

| | | |
|---|---|---|
| EP | 0 540 192 | 5/1993 |
| EP | 1 298 296 | 4/2003 |
| FR | 1 262 452 | 5/1961 |
| GB | 758 206 | 10/1956 |

OTHER PUBLICATIONS

International Search Report issued Apr. 8, 2010 in PCT/EP10/051122 filed Jan. 29, 2010.

*Primary Examiner* — William E Dondero
*Assistant Examiner* — Minh Truong
(74) *Attorney, Agent, or Firm* — Oblon, Spivak, McClelland, Maier & Neustadt, L.L.P.

(57) ABSTRACT

An assembly that includes an accessory gearbox (AGB) and a tank for a liquid lubricant for a turbojet engine. The AGB includes a gear connected to parallel shafts for mechanically driving accessories. The assembly includes a housing with two compartments and a partition perpendicular to the shafts for separating the compartments, a compartment defining the accessory gearbox and a compartment defining the liquid tank. The assembly can be compact and easily manufactured.

14 Claims, 2 Drawing Sheets

(56) References Cited

U.S. PATENT DOCUMENTS

Figure 1:
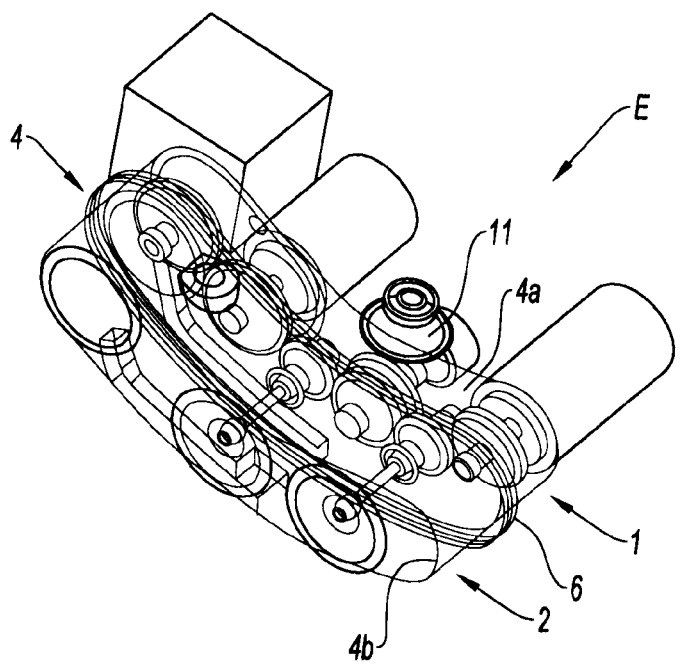

| | | | |
|---|---|---|---|
| 2,978,869 A * | 4/1961 | Hiscock et al. | 60/802 |
| 3,135,353 A * | 6/1964 | Orsini | 184/6.12 |
| 3,499,503 A * | 3/1970 | Geary, Jr et al. | 184/11.1 |
| 4,068,740 A * | 1/1978 | Quinn et al. | 184/6.12 |
| 4,525,995 A * | 7/1985 | Clark | 60/39.08 |
| 4,779,413 A * | 10/1988 | Mouton | 60/39.08 |
| 6,814,537 B2 * | 11/2004 | Olsen | 415/111 |
| 8,013,488 B2 * | 9/2011 | Berenger et al. | 310/113 |
| 2003/0059295 A1 | 3/2003 | Olsen | |
| 2005/0279102 A1 | 12/2005 | O'Connor | |
| 2006/0248865 A1 * | 11/2006 | Latulipe et al. | 55/400 |
| 2009/0000308 A1 * | 1/2009 | Cloft et al. | 60/802 |
| 2009/0317229 A1 * | 12/2009 | Suciu et al. | 415/1 |
| 2010/0300117 A1 * | 12/2010 | Moulebhar | 60/801 |

\* cited by examiner

ASSEMBLY INCLUDING AN AGB AND AN OIL TANK

The invention relates to an assembly comprising an accessory gearbox and a reservoir of lubricant for a turbojet engine.

A turbojet engine comprises, from the upstream and downstream in the direction in which the gases flow, a fan, one or more compressor stages, for example a high-pressure compressor, a combustion chamber, one or more turbine stages, for example a high-pressure turbine and a low-pressure turbine and a jet pipe through which the gases are exhausted. Each compressor has a corresponding turbine, the two being connected by a shaft, thus, for example, forming a high-pressure spool and a low-pressure spool.

Some of the power generated by a turbojet engine is used to power various auxiliaries of the turbojet engine. This power is tapped mechanically off the shaft of the high-pressure (HP) spool of the turbojet engine by a power take-off shaft which drives an input shaft of an accessory gearbox.

The accessory gearbox is well known to those skilled in the art by its English abbreviation AGB (which stands for accessory gearbox or auxiliary gearbox). This is a box containing gearing (a mechanism) connected to a certain number of auxiliaries or accessories, such as an electric generator, a starter motor, an alternator, hydraulic, fuel or oil pumps, etc, for example. These various accessories are mechanically driven by the gearing of the AGB which, via the input shaft entering the AGB, transmits to them the power tapped from the HP shaft.

The AGB generally comprises a box which is produced as a casting; it thus comprises a cast wall defining a housing to accommodate the gearing that drives the accessories. Each gearwheel of the gearing is secured to a driveshaft connected to an accessory. The various accessories driven by the AGB are mounted directly on the cast box, the drive shafts of the accessories passing through the wall of this box in order to drive them.

The engine also comprises a lubricating circuit which supplies oil to the various engine components that need it. The lubricating circuit more specifically comprises an oil reservoir, a lubricating unit (which circulates the oil through the circuit), and oil lines that carry the oil to the components that require lubrication. The lubricating unit is generally mounted near the AGB because it is driven thereby.

In some engines, for reasons of compactness and to save on piping it is preferable for the oil reservoir to be mounted directly on the AGB. To do that, the oil reservoir can in fact be formed as an outgrowth on the casting that forms the housing part of the AGB. The problem with this type of casting is the difficulty in the designing and manufacturing thereof because casting is a technique that is difficult to master and the cost of such a component with an outgrowth, which is therefore complicated, is considerable.

In other engines, the oil reservoir is separated from the AGB, making it possible for the AGB to be formed directly by machining a metal slug. Such components that are produced directly by machining are commonly known to those skilled in the art as components that are "machined from solid", for which the equivalent French terms are "usinées-masse" or "taillées-masse". More specifically, in this case, the AGB can be formed using a technique known as "split-line" (an expression derived from the fact that there is a dividing line), in which two half-shells are used to form the AGB housing. The oil reservoir, formed as a casting, is therefore remote from the AGB and needs to be connected to it, this entailing the use of piping to connect the two together.

The invention aims to propose a simpler design of AGB and oil reservoir, that allows these items to be manufactured at lower cost.

Thus, the invention relates to an assembly comprising an accessory gearbox and a reservoir of lubricant for a turbojet engine, the accessory gearbox comprising gearing connected to mutually parallel shafts that mechanically drive the accessories, the assembly being characterized in that it comprises a box with two compartments and a partition, perpendicular to said shafts, that separates the compartments, one compartment forming the accessory gearbox and one compartment forming the lubricant reservoir.

Thanks to the invention, the assembly is an integral one and therefore compact, whereas its manufacture is simple because of the way the compartments are arranged in relation to the shafts connected to the gearing.

According to a preferred embodiment, the box for the whole assembly (and therefore the compartments) has generally a shape that is elongate and curved, designed to follow the shape of a cylindrical casing of the turbojet engine to which it is intended to be fixed.

It will be understood that, in this case, with the turbojet engine running generally along an axis, the gearing of the accessory gearbox is intended to be driven by a power take-off shaft substantially perpendicular to the axis of the turbojet engine.

According to one preferred embodiment, the compartments are manufactured by machining from a solid block of metal. The use of such a method of machining from a block of material means that the compartments are formed without a casting operation; in other words, this type of method allows the manufacture of components generally known by the expression "machined from solid" (for which the French equivalents are "usinées-masse" or "taillées-masse"). The use of such a method resolves the problems listed above in terms of the use of casting and is made possible by the above-defined configuration of the compartments of the assembly.

According to one preferred embodiment, the compartments are formed of two half-shells fixed together.

According to one preferred embodiment, each half-shell comprises at least one opening delimited by an edge and the half-shells are fixed together along this edge, preferably with the partition.

According to one preferred embodiment, the opening of each half-shell has dimensions which are greater than or equal to those of the projection, onto a plane perpendicular to the drive shafts, of the gearing of the accessory gearbox.

According to one preferred embodiment, the half-shells are fixed together, preferably with the partition, removably, for example by screw-fastening. Thus, it is possible for them to be taken apart in order to gain access to the interior of the compartment that forms the box part of the AGB for servicing and maintenance purposes.

According to one preferred embodiment, the partition is secured nonremovably to the half-shell that forms the lubricant reservoir, for example is welded thereto.

According to one embodiment, the compartments are of a shape that is elongate in a general direction perpendicular to the accessory drive shafts.

According to a preferred embodiment, the compartment that forms the lubricant reservoir also acts as a support for at least some of the accessories driven by the accessory gearbox.

According to one form of embodiment which is preferred in this instance, with the drive shafts that drive said accessories extending at least partially into the compartment that forms the reservoir, protective tubes, along which said shafts extend, are mounted in the reservoir.

Figure 2:
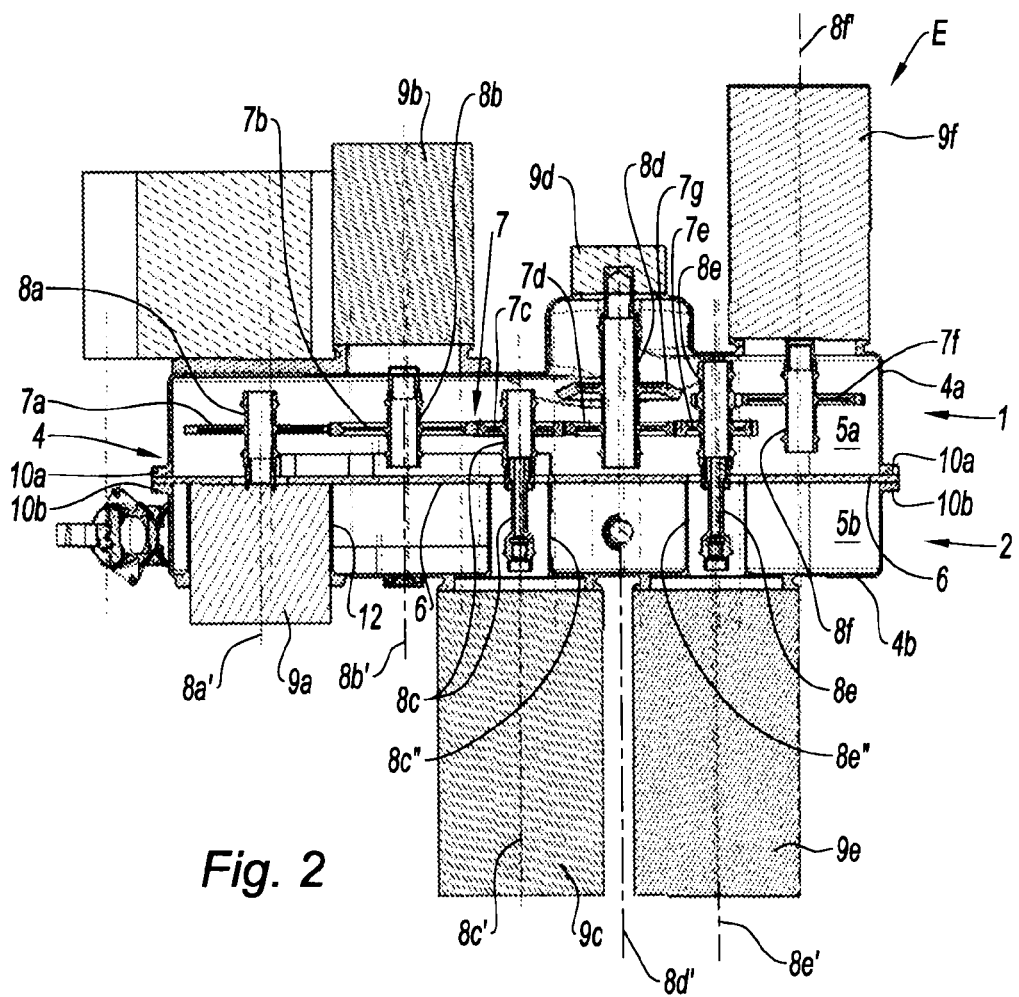
Figure 3:
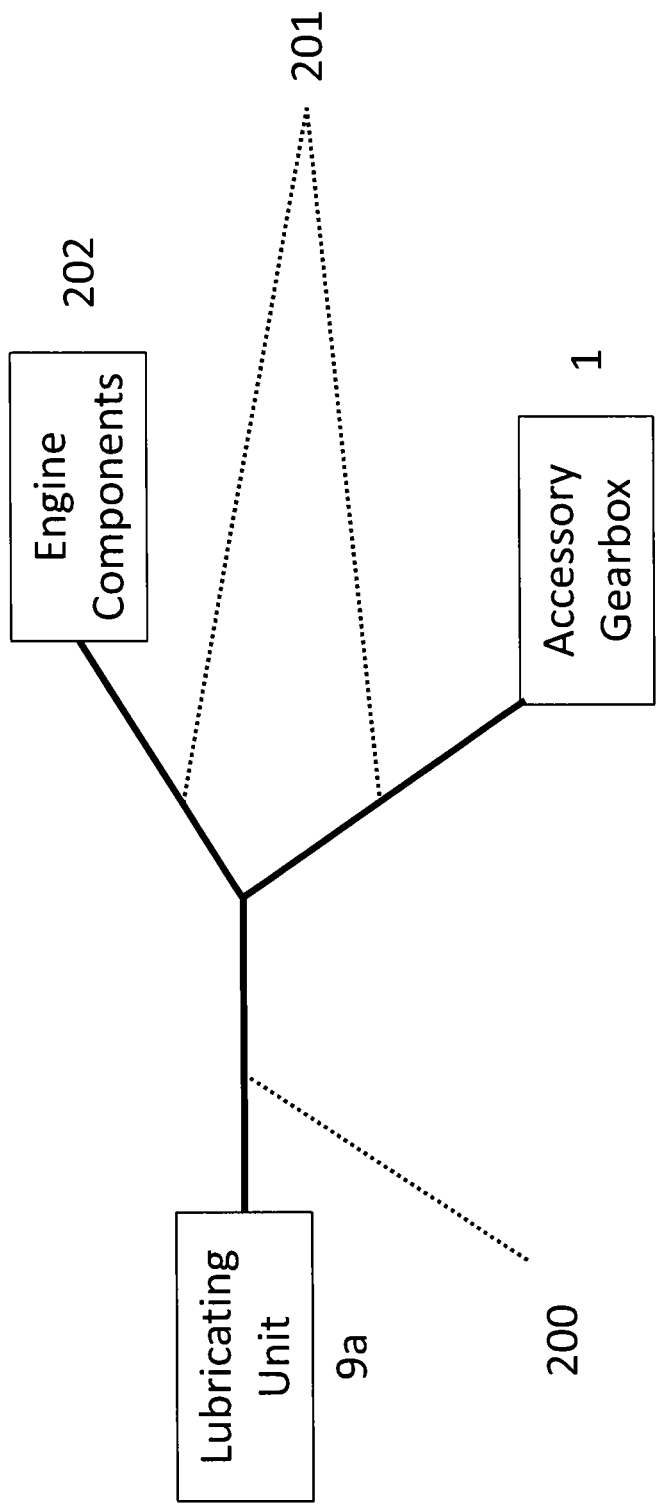

The invention will be better understood with the aid of the following description of the preferred embodiment of the assembly of an AGB and of a reservoir of the invention, with reference to the attached plates of drawings, in which:

FIG. 1 depicts a perspective drawing of the preferred embodiment of the assembly of the invention, FIG. 2 depicts the assembly of FIG. 1 in a view in cross section on a plane perpendicular to the partition that separates the two compartments thereof, and FIG. 3 depicts a schematic representation of a lubricating circuit in an exemplary embodiment.

The invention is described with reference to a turbojet engine. The turbojet engine comprises a high-pressure spool and a low-pressure spool, each spool comprising a compressor and turbine, in the conventional way. Mounted on the high-pressure spool is a power take-off mechanism driving a power take-off shaft mechanically connected to an accessory gearbox 1 hereinafter known by its abbreviation AGB 1. More specifically, the power take-off shaft transmits the movement from the rotary shaft of the high-pressure spool to an input (or drive) shaft of the AGB 1. The input shaft of the AGB 1 is connected to the AGB 1 by a connecting piece 11 fixed to a wall of the AGB, in this instance to the upper wall in FIG. 1. The input shaft, supported by the connecting piece 11, passes through the upper wall of the AGB 1 in the conventional way.

The turbojet engine also comprises a lubricating circuit comprising an oil reservoir 2, a lubricating unit 9a (not depicted in FIG. 1 but visible in FIG. 2) and lines carrying the oil to the components that need lubricating, the lines not being depicted. Note, as shown in FIG. 3, that the lubricating lubricant unit 9a comprises in this instance an oil feed pump feeding oil to a main line 200 from which the oil is guided so that it can be fed to all the oil supply lines 201 that supply the various engine components 202 with oil, these lines being connected directly or indirectly to the main oil line. The lubricating unit 9a further comprises a plurality of pumps—in this instance four pumps—which suck up the oil recovered (generally under gravity) from the turbojet engine components that have been lubricated; the oil thus recovered is reintroduced into the oil reservoir 2 from where it is pumped into the main line of the circuit. The lubricating circuit supplies lubricating oil to those engine components or auxiliaries that need it, for example to the engine shaft bearings or the gearing of the AGB 1.

With reference to FIG. 1, the AGB 1 and the oil reservoir 2 are designed to form an integrated assembly E. This assembly E comprises a box 4 formed of two half-shells 4a, 4b defining a first compartment 5a and a second compartment 5b, respectively, the two compartments 5a, 5b being separated by a partition 6.

The first compartment 5a forms the AGB 1. For this purpose, it creates a housing for gearing 7 (or a mechanism 7) mechanically connected to the input shaft of the AGB 1, the gearing 7 being designed to transmit the movements of the input shaft from the AGB 1 to accessories 9a, 9b, 9c, 9d, 9e, 9f of the turbojet engine. The gearing 7 comprises a plurality of gearwheels 7a, 7b, 7c, 7d, 7e, 7f secured to a plurality of shafts 8a, 8b, 8c, 8d, 8e, 8f driving respective accessories 9a, 9b, 9c, 9d, 9e, 9f. It further comprises a gearwheel 7g, in this instance a bevel gear 7g, secured to one of the shafts 8d, which meshes with a bevel gear secured to the input shaft of the AGB 1 to drive all the wheels 7a-7f of the gearing 7 by the input shaft of the AGB 1. Each drive shaft 8a, 8b, 8c, 8d, 8e, 8f extends along an axis 8a', 8b', 8c', 8d', 8e', 8f'. The shafts 8a-8f are arranged parallel to one another in a way that is conventional in an AGB 1. In this particular instance, the accessories comprise the lubricating unit 9a, a fuel pump 9b, an air-driven starter 9c, a low-power generator 9d such as a permanent-magnet motor, a starter generator 9e and a hydraulic pump 9f; these accessories 9a-9f are listed by way of example.

The second compartment 5b acts as an oil reservoir for the lubricating circuit; or in other words, it forms the oil reservoir 2 for this circuit. It forms a closed space in which the oil lies.

The partition 6 that separates the two compartments 5a, 5b from one another is fixed between the two half-shells 4a, 4b that form the compartments 5a, 5b and prevents any fluidic communication between the two so as to prevent oil from the reservoir 2 from flowing unwantedly into the compartment 5a of the AGB 1. The partition 6 runs perpendicular to the shafts 8a, 8b, 8c, 8d, 8e, 8f.

The assembly E comprising the AGB 1 and the oil reservoir 2 is, in this instance of a shape that is generally elongate. More specifically, the box 4 of the assembly E has generally a shape that is elongate and curved, in this instance designed to follow the shape of a (cylindrical) casing of the turbojet engine to which it is intended to be fixed. A person skilled in the art speaks often of a "banana" or "kidney bean" shape; this more specifically is a shape with faces (the front and rear faces in FIG. 1) that are perpendicular to the drive shafts 8a-8f which are planar and mutually parallel, these (front and rear) faces being connected by faces (lower and upper faces in FIG. 1) each of which is in the shape of a portion of a cylinder; the ends of the box 4 are formed by the curved faces that continuously connect the cylindrical faces together. The major (mean) dimension of the assembly E is perpendicular to the shafts 8a-8f that drive the accessories 9a-9f.

Each half-shell 4a, 4b has an opening over the entirety of a face which is perpendicular to the drive shafts 8a-8f that drive the accessories 9a-9f. The opening of each half-shell 4a, 4b is delimited by an edge 10a, 10b, here in the form of a respective flange 10a, 10b; thus, this flange 10a, 10b runs perpendicular to the drive shafts 8a-8f. The half-shells 4a, 4b are fixed together along these flanges 10a, 10b in this instance by screw-fastening. The dividing partition 6 is also fixed to the assembly E by screw-fastening; in this particular instance, the same screws join the flanges 10a, 10b together and to the periphery of the dividing partition 6 which is sandwiched between the flanges 10a, 10b.

Thanks to the configuration of the assembly E with a dividing partition 6 perpendicular to the shafts 8a-8f, it is possible for the AGB 1 and the oil reservoir 2 to be manufactured simultaneously by a method of machining from a solid block of metal, for example a metal slug, made of aluminum, of titanium or of magnesium, for example. Such a machining method is far less expensive to implement than a method of manufacture involving casting. It is to some extent a method that makes it possible to obtain a box 4 constructed in "split-line" technology, with two compartments separated by a partition and performing distinct functions.

In as much as the dividing partition 6 is perpendicular to the drive shafts 8a-8f, that means that the opening of the half-shells 4a, 4b that form the AGB 1 and the oil reservoir 2 are sufficient in size to allow a machining method to be employed and, in particular to allow the machine tools, for example milling cutters, to pass. In particular, the openings here have dimensions corresponding to the projected image of the set of gearing 7 that the AGB 1 is to contain onto a plane perpendicular to the drive shafts 7, for example onto a mean plane of the dividing partition 8; this projected image or projection corresponds to the transverse space that needs to be allowed, with respect to the axes 8a'-8f' of the drive shafts 8a-8f, for the gearing 7 of the AGB 1.

According to an alternative form of embodiment that has not been depicted, the dividing partition 6 is fixed securely and nonremovably to the half-shell 4b that forms the oil reservoir 2; such an attachment may for example be achieved by welding. The advantage of such a solution is as follows: it may sometimes prove necessary to remove the assembly E comprising an AGB 1 and a reservoir 2 in order to carry out maintenance operations on the gearing 7 of the AGB 1. Such operations are not, however, needed on the oil reservoir 2. Consequently, it is possible for the partition 6 to be secured fixedly to the oil reservoir 2 but fixed (together with the oil reservoir 2) removably to the half-shell 4a that forms the AGB 1.

With reference to FIG. 2 (but not to FIG. 1 where they have not been depicted), certain accessories 9a, 9c, 9e are mounted directly on the half-shell 4b that forms the oil reservoir 2. More specifically, the lubricating unit 9a is mounted, in part, directly within the volume of the oil reservoir 2 (inside a protective sleeve 12) and thus the pumps of the lubricating unit 9a suck up the oil from or deliver oil to the reservoir 2 directly. The air-powered starter 9c and the starter—generator 9e are mounted on the wall of the half-shell 4b that faces the dividing partition 6 and therefore extends at right angles to their drive shafts 8a-8f (it is the front wall in FIG. 1). These drive shafts 8c, 8e therefore pass through the volume of the compartment 5b that forms the oil reservoir 2 and in order for the fact that the shafts 8c, 8e extend through the compartment 5b not to be a problem, protective tubes 8c", 8e" are mounted in the compartment 5b, between the dividing partition 6 and the opposite wall of the half-shell 4b, to house the drive shafts 8c, 8e which therefore extend through these protective tubes 8c", 8e", the protective tubes preventing any direct contact between the drive shafts 8c, 8e and the oil contained in the reservoir 2.

The invention claimed is:

1. An assembly comprising:
an accessory gearbox, including gearing connected to mutually parallel shafts that mechanically drive accessories;
a reservoir of lubricant for a turbojet engine, the lubricant being supplied to the accessory gearbox; and
a box including the accessory gearbox, the lubricant reservoir, and a partition, perpendicular to the mutually parallel shafts, that separates the accessory gearbox and the lubricant reservoir, the partition extending from a first end of the accessory gearbox and the lubricant reservoir to a second end of the accessory gearbox and the lubricant reservoir, the box being of a shape that is curved, to follow a shape of a cylindrical casing of the turbojet engine to which the box is configured to be fixed, wherein
there is no fluidic communication through the partition between the accessory gearbox and the lubricant reservoir,
a main oil line guides the lubricant to an oil supply line which lubricates the accessory gearbox, and two adjacent shafts of the mutually parallel shafts extend in opposite directions from the gearing to transmit mechanical power respectively to accessories mounted on opposite sides of the box.

2. The assembly as claimed in claim 1, wherein, with the turbojet engine extending generally along an axis, the gearing of the accessory gearbox is configured to be driven by a power take-off shaft substantially perpendicular to the axis of the turbojet engine.

3. The assembly as claimed in claim 1, wherein the accessory gearbox and the lubricant reservoir are manufactured by machining from a solid block of metal.

4. The assembly as claimed in claim 1, wherein the accessory gearbox is formed of a first half-shell and the lubricant reservoir is formed of a second half-shell, wherein the half-shells are fixed together.

5. The assembly as claimed in claim 4, wherein the half-shells are fixed together, or are fixed together with the partition, removably, or by screw-fastening.

6. The assembly as claimed in claim 4, wherein the partition is secured nonremovably to the second half-shell that forms the lubricant reservoir, or is welded thereto.

7. The assembly as claimed in claim 1, wherein the box is of a shape that is generally elongate in a direction substantially perpendicular to the mutually parallel accessory drive shafts.

8. The assembly as claimed in claim 1, wherein the lubricant reservoir also acts as a support for at least some of the accessories driven by the accessory gearbox.

9. The assembly as claimed in claim 8, wherein, with the mutually parallel shafts that drive the accessories extending at least partially into the lubricant reservoir, protective tubes, along which the mutually parallel shafts extend, are mounted in the reservoir.

10. The assembly as claimed in claim 1, wherein the mutually parallel shafts cross the partition between the accessory gearbox and the lubricant reservoir, and are not in direct contact with the lubricant.

11. The assembly as claimed in claim 10, wherein protective tubes house the mutually parallel shafts and prevent direct contact between the shafts and the lubricant.

12. The assembly as claimed in claim 1, wherein at least one shaft of the mutually parallel shafts passes through a wall of the accessory gearbox and does not pass through the partition.

13. The assembly as claimed in claim 1, wherein at least one shaft of the mutually parallel shafts passes through the partition and does not pass through a wall of the accessory gearbox.

14. The assembly as claimed in claim 1, wherein the partition has a solid body, a first side of which forms an interior face of the accessory gearbox and a second side of which forms an interior face of the lubricant reservoir.

* * * * *